US012707195B2

(12) United States Patent
Kraewinkels, Jr. et al.

(10) Patent No.: US 12,707,195 B2
(45) Date of Patent: Aug. 11, 2026

(54) POWER CONTROL FOR SPEAKER DEVICES IN A WIRELESS MEDIA SYSTEM

(71) Applicant: ROKU, INC., San Jose, CA (US)

(72) Inventors: Neil Zhang Kraewinkels, Jr., San Jose, CA (US); Richard Jørgensen, San Jose, CA (US); Michael I. Smith, San Jose, CA (US)

(73) Assignee: Roku, Inc., San Jose, CA (US)

( * ) Notice: Subject to any disclaimer, the term of this patent is extended or adjusted under 35 U.S.C. 154(b) by 173 days.

(21) Appl. No.: 18/369,092

(22) Filed: Sep. 15, 2023

(65) Prior Publication Data

US 2024/0080617 A1 Mar. 7, 2024

Related U.S. Application Data

(63) Continuation of application No. 17/373,166, filed on Jul. 12, 2021, now Pat. No. 11,792,568.

(51) Int. Cl.
*H04R 3/00* (2006.01)

(52) U.S. Cl.
CPC ........... *H04R 3/00* (2013.01); *H04R 2420/07* (2013.01)

(58) Field of Classification Search
CPC .............................. H04R 3/00; H04R 2420/07
See application file for complete search history.

(56) References Cited

U.S. PATENT DOCUMENTS

| | | | |
|---|---|---|---|
| 11,792,568 B2 | 10/2023 | Kraewinkels et al. | |
| 2009/0081948 A1 | 3/2009 | Banks et al. | |
| 2012/0003934 A1 | 1/2012 | Lydon et al. | |

(Continued)

FOREIGN PATENT DOCUMENTS

| | | | |
|---|---|---|---|
| JP | 2006067336 A | 3/2006 | |
| KR | 10-2005-0107943 A | 11/2005 | |
| KR | 10-2015-0127314 A | 11/2015 | |

OTHER PUBLICATIONS

International Search Report and the Written Opinion of the International Searching Authority directed to International Application No. PCT/US2022/036119, mailed Oct. 19, 2022; 9 pages.

(Continued)

*Primary Examiner* — Andrew Sniezek
(74) *Attorney, Agent, or Firm* — STERNE, KESSLER, GOLDSTEIN & FOX P.L.L.C.

(57) ABSTRACT

Disclosed herein are system, apparatus, article of manufacture, method and/or computer program product embodiments, and/or combinations and sub-combinations thereof, for a wireless media system including a wireless speaker device and a host device forming a peer-to-peer wireless network. The host device provides audio content to the speaker device, and the speaker device can decode and process the audio content received from the host device. The speaker device can be in various states that consume different level of powers, such as a standby state, a wake state, a connected state. The speaker device can determine the host device is in an inactive state or an active state. When the speaker device determines the host device is in an inactive state, the speaker device can enter the standby state, enable the communication circuit and the audio processing circuit of the speaker device to be in a low power state to save power.

20 Claims, 6 Drawing Sheets

500

(56) References Cited

U.S. PATENT DOCUMENTS

| | | | | |
|---|---|---|---|---|
| 2016/0077791 | A1 | 3/2016 | Gossain et al. | |
| 2016/0162015 | A1* | 6/2016 | Moon | H04W 4/80<br>713/310 |
| 2017/0142536 | A1 | 5/2017 | Hattori et al. | |
| 2018/0063845 | A1 | 3/2018 | Goto | |
| 2022/0013131 | A1* | 1/2022 | Bouvigne | H04N 21/4307 |

OTHER PUBLICATIONS

Extended European Search Report for European Patent App. No. 22842659.9, dated Apr. 9, 2025, 11 pages.

* cited by examiner

POWER CONTROL FOR SPEAKER DEVICES IN A WIRELESS MEDIA SYSTEM

RELATED APPLICATIONS

This application is a continuation and claims benefit of U.S. patent application Ser. No. 17/373,166 filed Jul. 12, 2021, the content of which is herein incorporated by reference in its entirety.

BACKGROUND

Field

This disclosure is generally directed to control the power consumption of speaker devices in a wireless media system, and more particularly to a wireless media system having wireless speaker devices in a peer-to-peer wireless network.

Background

Media systems can include multiple media devices coupled together to provide audio, visual, and voice technologies for movies, TV, music, and gaming. Individual media devices include a streaming media device, a DVD or BLU-RAY device, an audio/video playback device, a cable box, and/or a digital video recording device, to name just a few examples. Multiple media devices can be coupled to generate improved user experiences with better sound or picture capabilities than an individual media device can provide. A wireless media system including wireless speaker devices can provide much more convenience compared to wired speaker devices. However, to control the power consumption of wireless devices may be a challenge.

SUMMARY

Provided herein are system, apparatus, article of manufacture, method and/or computer program product embodiments, and/or combinations and sub-combinations thereof, for a wireless media system having one or more wireless speaker devices forming a peer-to-peer wireless network. A wireless speaker device and a host device can form a peer-to-peer wireless network, where the host device can provide audio content to the speaker device, and the speaker device can decode and process the audio content received from the host device, and play the audio content. However, when the host device is not providing audio content and the speaker device is not playing any audio content, the speaker device may still remain in a state that consumes high power, e.g., over 2 watt (W).

An example embodiment of a wireless media system has at least a wireless speaker device and a host device forming a peer-to-peer wireless network. The speaker device can be in various states that consume different level of powers, such as a standby state, a wake state, a connected state, and more. The speaker device can include various components, such as a communication circuit, an audio processing circuit, and more circuits and components. The communication circuit and the audio processing circuit can be in different state consuming different level of powers. The communication circuit can be in a second state of the communication circuit different from a first state of the communication circuit, where the second state of the communication circuit consumes less power than the first state of the communication circuit. Similarly, the audio processing circuit can be in a second state of the audio processing circuit different from a first state of the audio processing circuit, where the second state of the audio processing circuit consumes less power than the first state of the audio processing circuit. When the speaker device is in a wake state, the speaker device can determine the host device is in an inactive state or an active state. When the speaker device determines the host device is in an inactive state, the speaker device can enter the standby state, enable the communication circuit to be in the second state of the communication circuit, and further enable the audio processing circuit to be in the second state of the audio processing circuit to save power.

BRIEF DESCRIPTION OF THE FIGURES

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

A media system having multiple media devices has the potential to produce better user experiences than an individual media device alone. Multiple media devices including a host device and a speaker device can form various networks. For example, the host device such as a TV can function as a master or controller to send instructions to the speaker device to control the state of the speaker device. However, for each different kind of speaker device, the host device may have to implement a specific control for the speaker device, which can be a challenge to the manufacturer. This can become a problem if the speaker device is manufactured after the host device is made. Updates or changes to the host device may have to be made to accommodate the newer speaker device, which can be costly to implement.

Embodiments herein present a media system including a host device and a speaker device to form a peer-to-peer wireless network. Instead of having the host device to control the speaker device on its state, the speaker device can detect the state of the host device, and further enter a different state according to the detected state of the host device. Accordingly, no change or update to the host device may be needed to coordinate states with the speaker device. Therefore, embodiments herein can have the advantage of more flexibility in setting up the media system with saved cost.

In some embodiments, a wireless media system can include a wireless speaker device and a host device forming a peer-to-peer wireless network. The host device provides audio content to the speaker device, and the speaker device can decode and process the audio content received from the host device, and play the audio content. The speaker device can be in various states that consume different level of powers, such as a standby state, a wake state, a connected state, and more. The speaker device can include various components, such as a communication circuit, an audio processing circuit, and more circuits and components. The communication circuit and the audio processing circuit can be in different state consuming different level of powers. When the speaker device is in a wake state, the speaker device can determine the host device is in an inactive state or an active state. When the speaker device determines the host device is in an inactive state, the speaker device can enter the standby state, enable the communication circuit and the audio processing circuit to be in a low power state to save power. Hence, the speaker device can enter a low power or standby state without any instruction from the host device for doing so.

Figure 1:
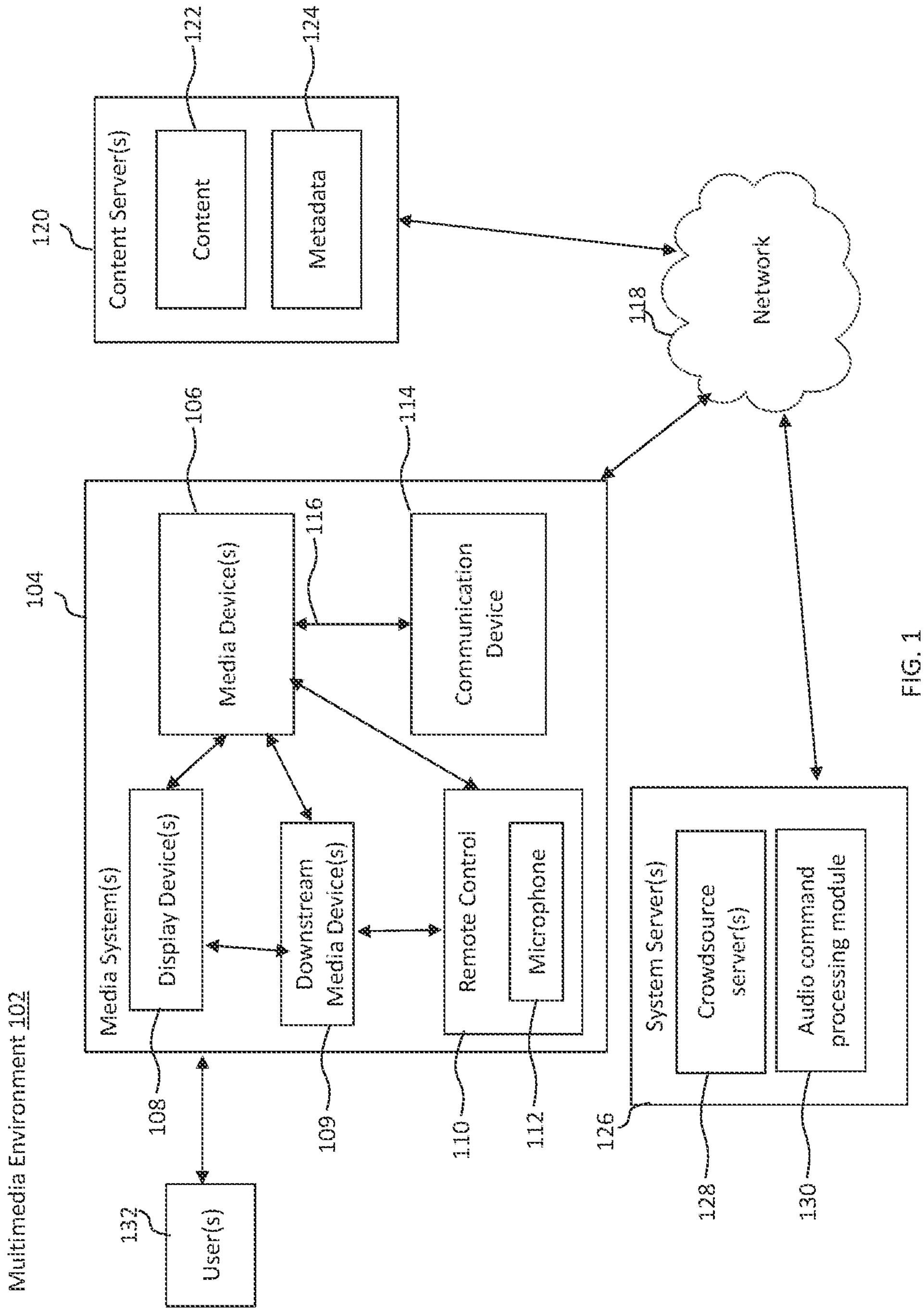
FIG. 1 illustrates a block diagram of a multimedia environment, according to some embodiments.

Various embodiments of this disclosure may be implemented using and/or may be part of a multimedia environment 102 shown in FIG. 1. It is noted, however, that multimedia environment 102 is provided solely for illustrative purposes, and is not limiting. Embodiments of this disclosure may be implemented using and/or may be part of environments different from and/or in addition to multimedia environment 102, as will be appreciated by persons skilled in the relevant art(s) based on the teachings contained herein. An example of multimedia environment 102 shall now be described.

Multimedia Environment

FIG. 1 illustrates a block diagram of multimedia environment 102, according to some embodiments. Multimedia environment 102 illustrates an example environment, architecture, ecosystem, etc., in which various embodiments of this disclosure may be implemented. However, multimedia environment 102 is provided solely for illustrative purposes, and is not limiting. Embodiments of this disclosure may be implemented and/or used in environments different from and/or in addition to multimedia environment 102 of FIG. 1, as will be appreciated by persons skilled in the relevant art(s) based on the teachings contained herein.

In a non-limiting example, multimedia environment 102 may be directed to streaming media. However, this disclosure is applicable to any type of media (instead of or in addition to streaming media), as well as any mechanism, means, protocol, method and/or process for distributing media.

Multimedia environment 102 may include one or more media systems 104. Media system 104 could represent a family room, a kitchen, a backyard, a home theater, a school classroom, a library, a car, a boat, a bus, a plane, a movie theater, a stadium, an auditorium, a park, a bar, a restaurant, or any other location or space where it is desired to receive and play streaming content. User(s) 132 may operate with media system 104 to select and consume content.

Each media system 104 may include one or more media devices 106 each coupled to one or more display devices 108, which may be further coupled to one or more downstream media devices 109. It is noted that terms such as "coupled," "connected to," "attached," "linked," "combined" and similar terms may refer to physical, electrical, magnetic, logical, etc., connections, unless otherwise specified herein.

Media device 106 may be a streaming media device, a streaming set-top box (STB), cable and satellite STB, a DVD or BLU-RAY device, an audio/video playback device, ca able box, and/or a digital video recording device, to name just a few examples. Display device 108 may be a monitor, a television (TV), a computer, a computer monitor, a smart phone, a tablet, a wearable (such as a watch or glasses), an appliance, an internet of things (IoT) device, and/or a projector, to name just a few examples. In some embodiments, media device 106 can be a part of, integrated with, attached to, operatively coupled to, and/or connected to its respective display device 108. Downstream media device 109 can be a speaker, audio/video receivers (AVRs), soundbars, or other audio devices attached to display device 108. Media device 106 can provide multimedia content to display device 108 and downstream media device 109. Hence media device 106 can be referred to as a source media device.

Each media device 106 may be configured to communicate with network 118 via a communication device 114. Communication device 114 may include, for example, a cable modem or satellite TV transceiver. Media device 106 may communicate with communication device 114 over a link 116, wherein link 116 may include wireless (such as WiFi) and/or wired connections.

In various embodiments, network 118 can include, without limitation, wired and/or wireless intranet, extranet, Internet, cellular, Bluetooth, infrared, and/or any other short range, long range, local, regional, global communications mechanism, means, approach, protocol and/or network, as well as any combination(s) thereof.

Media system 104 may include a remote control 110. Remote control 110 can be any component, part, apparatus and/or method for controlling media device 106, display device 108, and/or downstream media device 109, such as a remote control, a tablet, laptop computer, smartphone, wearable, on-screen controls, integrated control buttons, audio controls, or any combination thereof, to name just a few examples. In an embodiment, remote control 110 wirelessly communicates with media device 106, display device 108, and/or downstream media device 109 using cellular, Bluetooth, infrared, etc., or any combination thereof.

Multimedia environment 102 may include a plurality of content servers 120 (also called content providers or sources 120). Although only one content server 120 is shown in FIG. 1, in practice the multimedia environment 102 may include any number of content servers 120. Each content server 120 may be configured to communicate with network 118.

Each content server 120 may store content 122 and metadata 124. Content 122 may include any combination of music, videos, movies, TV programs, multimedia, images, still pictures, text, graphics, gaming applications, advertisements, programming content, public service content, government content, local community content, software, and/or any other content or data objects in electronic form.

In some embodiments, metadata 124 comprises data about content 122. For example, metadata 124 may include associated or ancillary information indicating or related to writer, director, producer, composer, artist, actor, summary, chapters, production, history, year, trailers, alternate versions, related content, applications, and/or any other information pertaining or relating to content 122. Metadata 124 may also or alternatively include links to any such information pertaining or relating to content 122. Metadata 124 may also or alternatively include one or more indexes of content 122, such as but not limited to a trick mode index.

Multimedia environment 102 may include one or more system servers 126. System servers 126 may operate to support media device 106 from the cloud. It is noted that the structural and functional aspects of system servers 126 may wholly or partially exist in the same or different ones of system servers 126.

Media devices 106 may exist in thousands or millions of media systems 104. Accordingly, media devices 106 may lend themselves to crowdsourcing embodiments and, thus, system servers 126 may include one or more crowdsource servers 128.

For example, using information received from media devices 106 in the thousands and millions of media systems 104, crowdsource server(s) 128 may identify similarities and overlaps between closed captioning requests issued by different users 132 watching a particular movie. Based on such information, crowdsource server(s) 128 may determine that turning closed captioning on may enhance users' viewing experience at particular portions of the movie (for example, when the soundtrack of the movie is difficult to hear), and turning closed captioning off may enhance users' viewing experience at other portions of the movie (for example, when displaying closed captioning obstructs critical visual aspects of the movie). Accordingly, crowdsource server(s) 128 may operate to cause closed captioning to be automatically turned on and/or off during future streaming of the movie.

System servers 126 may also include an audio command processing module 130. As noted above, remote control 110 may include a microphone 112. Microphone 112 may receive audio data from user 132 (as well as other sources, such as display device 108). In some embodiments, media device 106 may be audio responsive, and the audio data may represent verbal commands from user 132 to control media device 106 as well as other components in media system 104, such as display device 108.

In some embodiments, the audio data received by microphone 112 in remote control 110 is transferred to media device 106, which is then forwarded to audio command processing module 130 in system servers 126. Audio command processing module 130 may operate to process and analyze the received audio data to recognize a verbal command from user 132. Audio command processing module 130 may then forward the verbal command back to media device 106 for processing.

Figure 2:
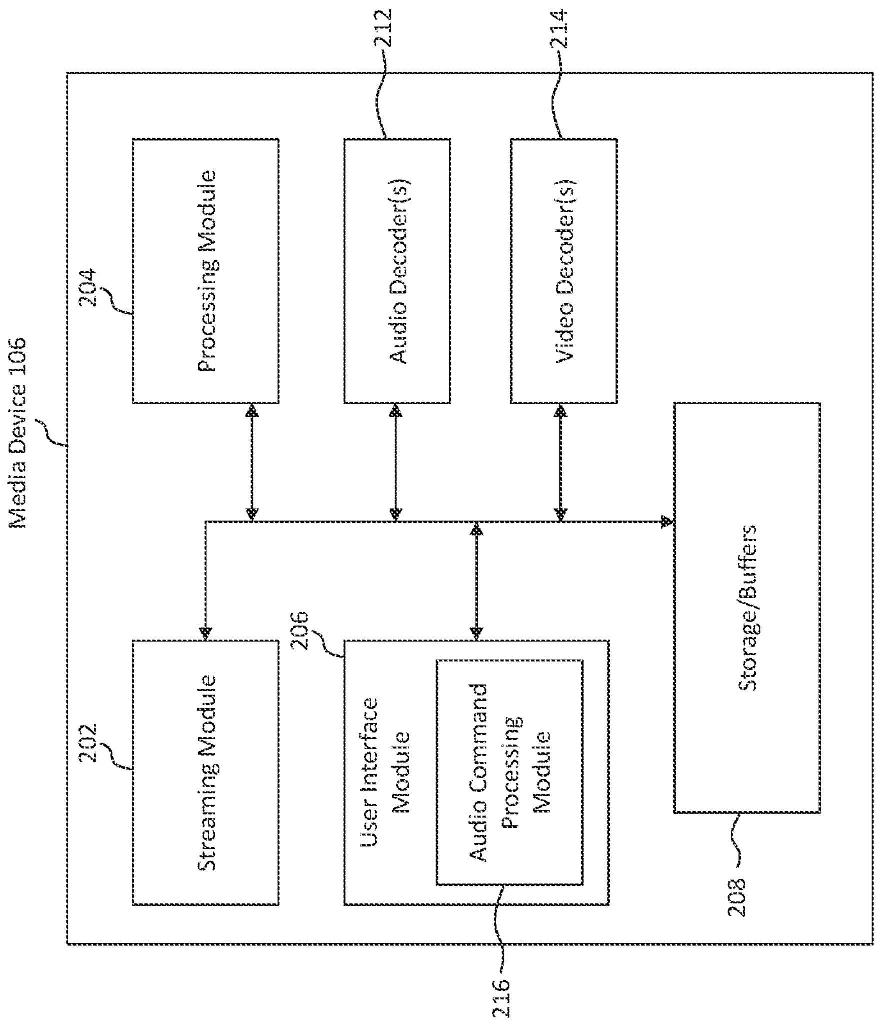
FIG. 2 illustrates a block diagram of a streaming media device, according to some embodiments.

In some embodiments, the audio data may be alternatively or additionally processed and analyzed by an audio command processing module 216 in media device 106 (see FIG. 2). Media device 106 and system servers 126 may then cooperate to pick one of the verbal commands to process (either the verbal command recognized by audio command processing module 130 in system servers 126, or the verbal command recognized by audio command processing module 216 in media device 106).

FIG. 2 illustrates a block diagram of an example media device 106, according to some embodiments. Media device 106 may include a streaming module 202, a processing module 204, a storage/buffers 208, and a user interface module 206. As described above, user interface module 206 may include audio command processing module 216.

Media device 106 may also include one or more audio decoders 212 and one or more video decoders 214.

Each audio decoder 212 may be configured to decode audio of one or more audio formats, such as but not limited to AAC, HE-AAC, AC3 (Dolby Digital), EAC3 (Dolby Digital Plus), WMA, WAV, PCM, MP3, OGG GSM, FLAC, AU, AIFF, and/or VOX, to name just some examples.

Similarly, each video decoder 214 may be configured to decode video of one or more video formats, such as but not limited to MP4 (mp4, m4a, m4v, f4v, f4a, m4b, m4r, f4b, mov), 3GP (3gp, 3gp2, 3g2, 3gpp, 3gpp2), OGG (ogg, oga, ogv, ogx), WMV (wmy, wma, asf), WEBM, FLV, AVI, QuickTime, HDV, MXF (OP1a, OP-Atom), MPEG-TS, MPEG-2 PS, MPEG-2 TS, WAV, Broadcast WAV, LXF, GXF, and/or VOB, to name just some examples. Each video decoder 214 may include one or more video codecs, such as but not limited to H.263, H.264, HEV, MPEG1, MPEG2, MPEG-TS, MPEG-4, Theora, 3GP, DV, DVCPRO, DVCPRO, DVCProHD, IMX, XDCAM HD, XDCAM HD422, and/or XDCAM EX, to name just some examples.

Now referring to both FIGS. 1 and 2, in some embodiments, user 132 may interact with media device 106 via, for example, remote control 110. For example, user 132 may use remote control 110 to interact with user interface module 206 of media device 106 to select content, such as a movie, TV show, music, book, application, game, etc. Streaming module 202 of media device 106 may request the selected content from content server(s) 120 over network 118. Content server(s) 120 may transmit the requested content to streaming module 202. Media device 106 may transmit the received content to display device 108 and/or downstream media device 109 for playback to user 132.

In streaming embodiments, streaming module 202 may transmit the content to display device 108 and/or downstream media device 109 in real time or near real time as it receives such content from content server(s) 120. In non-streaming embodiments, media device 106 may store the content received from content server(s) 120 in storage/buffers 208 for later playback on display device 108.

Display device 108 can be referred to as a host device, and downstream media device 109 can be referred to as a speaker device. Display device 108 and downstream media device 109 can form a peer-to-peer wireless network, while display device 108 and media device 106 can form a same or different network. In some examples, display device 108 and media device 106 can form a local area network (LAN). As noted above, this disclosure describes various embodiments for control power consumption of downstream media device 109 according to a state of display device 108, without display device 108 providing instructions to downstream media device 109.

Coordination Between a Source Media Device, a Host Device, and a Speaker Device.

Figure 3:
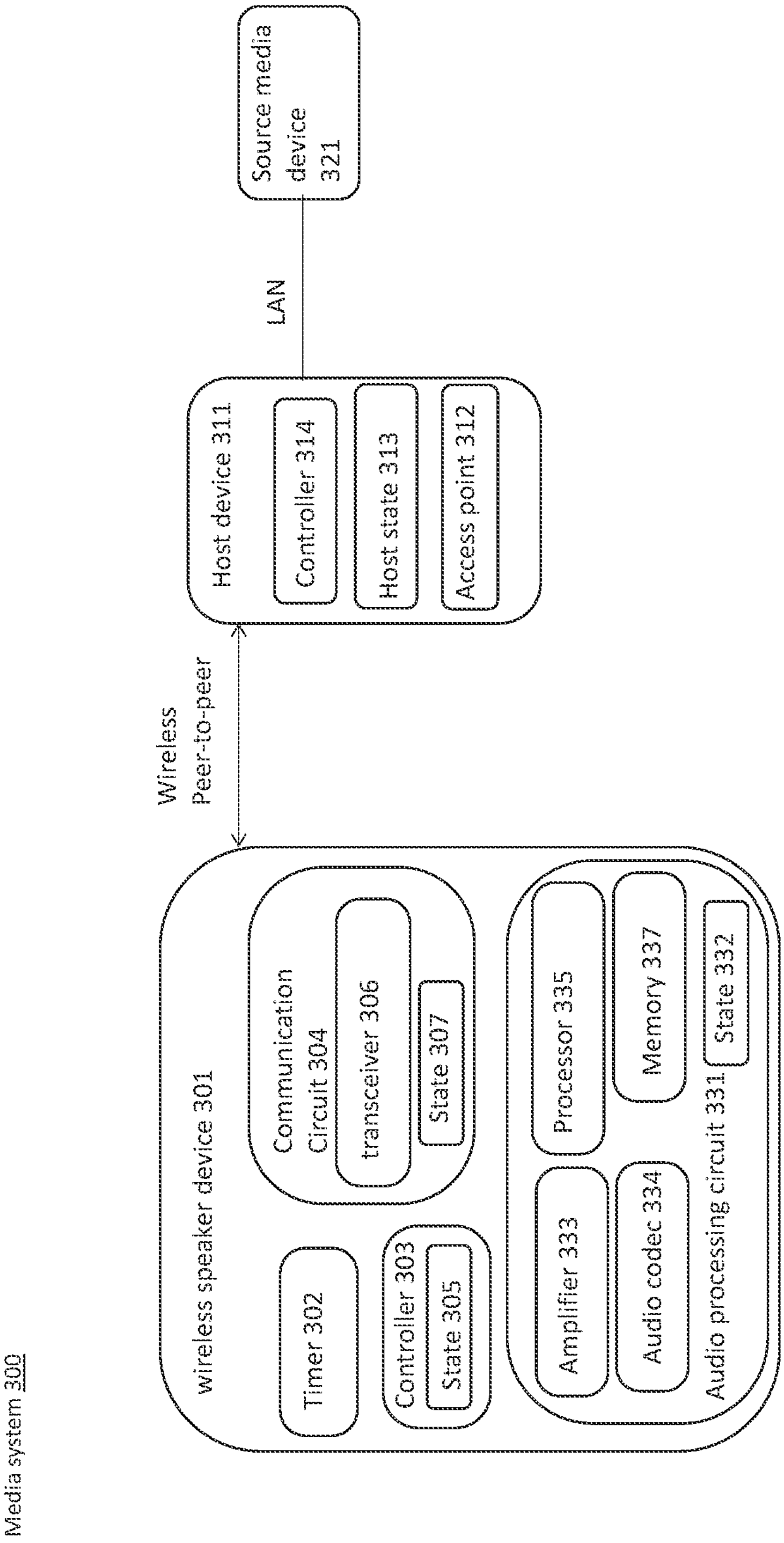
FIG. 3 illustrates an example block diagram of a wireless media system including a speaker device and a host device, according to some embodiments.

FIG. 3 illustrates an example block diagram of media system 300 including a speaker device 301 and a host device 311, according to some embodiments. Host device 311 can be coupled to a source media device 321. Source media device 321, host device 311, and speaker device 301 are examples of media device 106, display device 108, and downstream media device 109, as shown in FIG. 1. Host device 311 can be a TV device, and speaker device 301 can be a speaker, a sound bar, or an AVR. Source media device 321 and host device 311 can be coupled by a high-definition multimedia interface (HDMI) cable, some other wired connections, or wireless connections. Host device 311 and speaker device 301 can be communicatively coupled through wireless communication.

In some embodiments, speaker device 301 can include a timer 302, a controller 303, a communication circuit 304, an audio processing circuit 331, and other components. Communication circuit 304 can include a transceiver 306, which can be a wireless transceiver for the peer-to-peer wireless network, and other communication circuit components. Audio processing circuit 331 can include an audio amplifier 333, an audio codec 334, a processor 335, a memory 337, and other components such as an audio mixer, or an audio frequency control circuit. Host device 311 can include a controller 314 and an access point 312 that can be a communication circuit.

In some embodiments, controller 303 or speaker device 301 can be in a state 305 selected from a set of states such as a standby state, a wake state, a connected state, an on state, an off state, an active state, an inactive state, a low power state, and more. In some examples, a state can be referred as an operational mode, or simply a mode. There can be different names used to refer to the states, such as a first state, a second state, a low power state, or a high power state. Similarly, host device 311 can be in a host state 313, which can be selected from a set of states, such as an active state, an interactive state, a low power state, a high power state, or other states.

Communication circuit 304 can have a state 307 selected from a set of states, such as a low power state or a high power state. Other states can be used as well, such as a first state or a second state. Communication circuit 304 can consume less power when it is in the second state or low power state. On the other hand, communication circuit 304 can consume more power when it is in the first state or the high power state. When communication circuit 304 is in the first state, communication circuit 304 can receive data packets from host device 311, or send data packets to host device 311. When communication circuit 304 is in the second state, communication circuit 304 can shut off some of the components to reduce power consumption. For example, communication circuit 304 can stop receiving or sending data packets when communication circuit 304 is in the second state.

Audio processing circuit 331 have a state 332 selected from a set of states, such as a low power state or a high power state. Other states can be used as well, such as a first state or a second state. Audio processing circuit 331 can consume less power when it is in the second state or low power state. On the other hand, audio processing circuit 331 can consume more power when it is in the first state or the high power state. When audio processing circuit 331 is in the first state, audio processing circuit 331 can decode and process the received data packets for audio content. When audio processing circuit 331 is in the second state, audio processing circuit 331 can shut off some of the components to reduce power consumption. For example, audio processing circuit 331 can stop decoding, processing data packets, or playing audio content when audio processing circuit 331 is in the second state.

In some embodiments, speaker device 301 and host device 311 can form a peer-to-peer wireless network. A peer-to-peer network allows wireless devices such as speaker device 301 and host device 311 to directly communicate with each other. Speaker device 301 and host device 311 within range of each other can discover and communicate directly without involving central access points. In some examples, speaker device 301 and host device 311 can form an IEEE 802.11 wireless network, which may be referred to as a Wi-Fi wireless network. In some other examples, speaker device 301 and host device 311 can form other peer-to-peer wireless network, such as an ad hoc wireless network, a Wi-Fi direct network, a Bluetooth® network, or other networks.

In some embodiments, host device 311 and source media device 321 may form a network different from the peer-to-peer network formed by speaker device 301 and host device 311. For example, host device 311 and source media device 321 can form a local area network (LAN), which can be a wired LAN or a wireless LAN. Some LAN architecture may support the peer-to-peer operational mode, while some other LAN architecture may have a central access point such as a router, which is different from the peer-to-peer operational mode.

Figure 4:
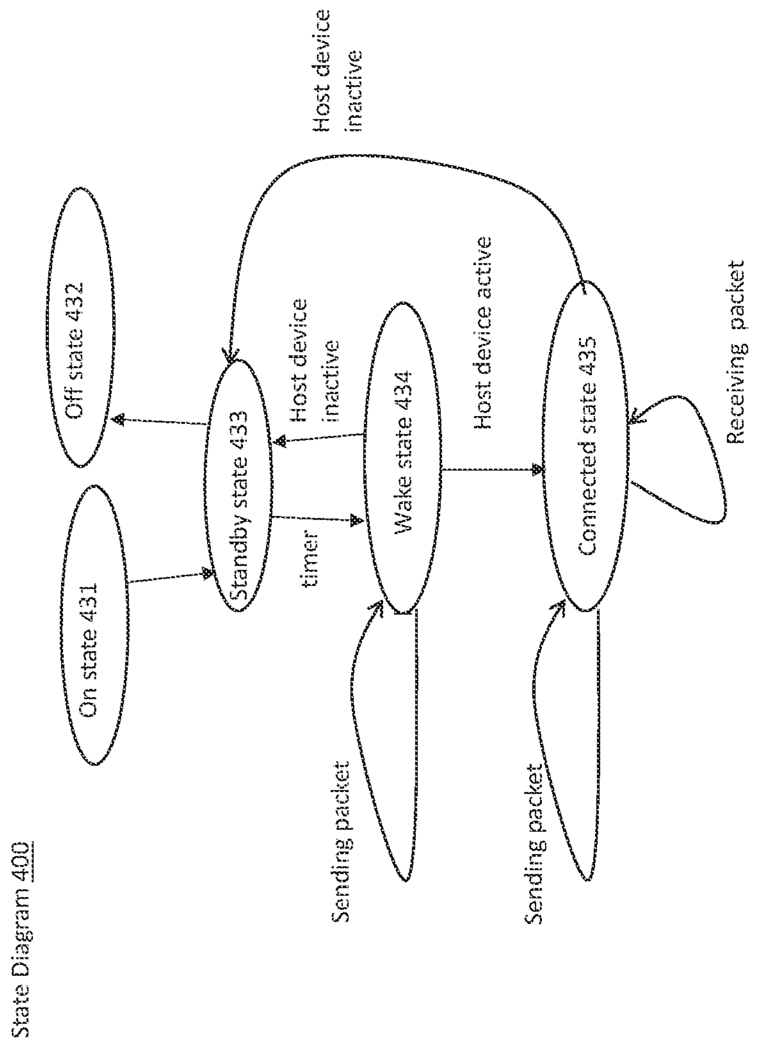
FIG. 4 illustrates a state diagram of operations performed by a speaker device in a wireless media system, according to some embodiments.

FIG. 4 illustrates a state diagram 400 of operations performed by speaker device 301 in media system 300, according to some embodiments. State diagram 400 can include an on state 431, an off state 432, a standby state 433, a wake state 434, and a connected state 435. Speaker device 301 can be in state 305, which can be any of the states shown in state diagram 400. In some examples, speaker device 301 can operate in more states than those shown in state diagram 400.

In some embodiments, when speaker device 301 is turned on, speaker device 301 can enter on state 431. While in on state 431, the controller 303 can perform various operations related to initialization of speaker device 301, e.g., starting the operating system, initializing various modules within speaker device 301, and more. After speaker device 301 is initialized and stabilized, speaker device 301 can enter standby state 433. Moreover, speaker device 301 can enter off state 432 when speaker device 301 is powered off.

In some embodiments, when speaker device 301 is in standby state 433, speaker device 301 can enter wake state 434 from standby state 433 periodically for a predetermined period. In some examples, speaker device 301 can enter wake state 434 when timer 302 expires after the predetermined period.

In some embodiments, when speaker device 301 is in wake state 434, speaker device 301 can determine host device 311 is in an inactive state or an active state. Furthermore, speaker device 301 can enter standby state 433 when speaker device 301 determines that host device 311 is in the inactive state. When speaker device 301 enters standby state 433, speaker device 301 can enable communication circuit 304 to be in the second state of the communication circuit to consume less power. For examples, some components of communication circuit 304 may be shut down and stop communication circuit 304 from sending data packets to or receiving data packets from host device 311. In addition, speaker device 301 can enable audio processing circuit 331 to be in a second state of audio processing circuit 331 to consume less power. For examples, some components of audio processing circuit 331 may be shut down and stop audio processing circuit 331 from decoding or processing audio content. In some embodiments, speaker device 301 can determine host device 311 is in the inactive state when speaker device 301 can send one or more packets to host device 311 at one or more time instances, and determine there is no response packet received from host device 311. For example, when speaker device 301 sends packets to host device 311 periodically for about 1 second, and receives no response from host device 311, speaker device 301 can determine host device 311 is in an inactive state.

In some embodiments, when speaker device 301 is in wake state 434, speaker device 301 can determine host device 311 is in the active state. Accordingly, speaker device 301 can enter connected state 435 when speaker device 301 determines that host device 311 is in the active state. When speaker device 301 enters connected state 435, speaker device 301 can enable communication circuit 304 to be in the first state of the communication circuit to receive data packets for audio content from host device 311, or send data packets to host device 311 to probe a response from host device 311. In addition, speaker device 301 can enable audio processing circuit 331 to be in the first state of the audio processing circuit to decode and process the received data packets for audio content. In some embodiments, speaker device 301 can determine host device 311 is in the active state when speaker device 301 sends one or more packets to host device 311 at one or more time instances, and receives one or more response packets from host device 311.

In some embodiments, when speaker device 301 is in connected state 435, speaker device 301 can determine host device 311 is in the inactive state, and enter standby state 433. Accordingly, speaker device 301 can enable communication circuit 304 to enter the second state of the communication circuit from the first state of the communication circuit, and enable audio processing circuit 331 to enter the second state of the audio processing circuit from the first state of the audio processing circuit. In some embodiments, speaker device 301 can determine host device 311 is in the inactive state when speaker device 301 can send one or more packets to host device 311 at one or more time instances, and determine there is no response packet received from host device 311.

In some embodiments, state diagram 400 is only an example, and can be implemented in different ways. In some examples, wake state 434 and connected state 435 may be implemented as one state to perform operations for both wake state 434 and connected state 435. In some examples, standby state 433 may include multiple states where speaker device 301 may consume different level of powers.

Figure 5:
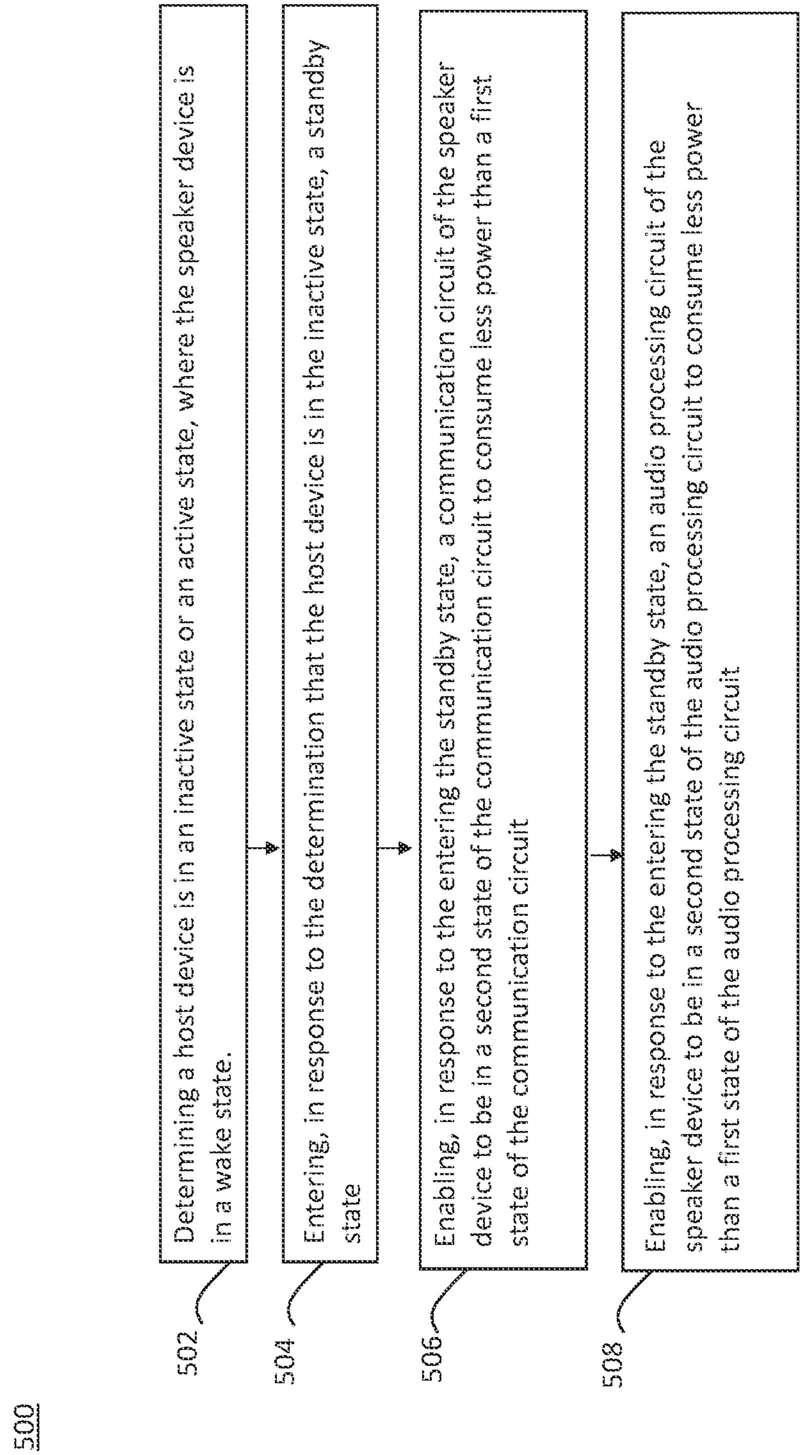
FIG. 5 illustrates an example process performed by a speaker device of a wireless media system, according to some embodiments.

FIG. 5 illustrates an example process 500 performed by speaker device 301 of a media system 300, according to some embodiments. Processes 500 can be performed by processing logic that can comprise hardware (e.g., circuitry, dedicated logic, programmable logic, microcode, etc.), software (e.g., instructions executing on a processing device, such as by controller 303), or a combination thereof. It is to be appreciated that not all steps may be needed to perform the disclosure provided herein. Further, some of the steps may be performed simultaneously, or in a different order than shown in FIG. 5, as will be understood by a person of ordinary skill in the art.

At 502, speaker device 301 can determine a host device is in an inactive state or an active state, where speaker device 301 is in a wake state, and the host device is communicatively coupled with the speaker device in a peer-to-peer wireless network. For example, as described for FIGS. 3 and 4, speaker device 301 can determine host device 311 is in an inactive state or an active state, where speaker device 301 is in wake state 433, as performed at 502.

At 504, speaker device 301 can enter, in response to the determination that the host device is in the inactive state, a standby state. For example, as described for FIGS. 3 and 4, speaker device 301 can enter, in response to the determination that host device 311 is in the inactive state, standby state 433, as part of the operations performed at 504.

At 506, speaker device 301 can enable, in response to the entering the standby state, a communication circuit of the speaker device to be in a second state of the communication circuit to consume less power than a first state of the communication circuit. For example, as described for FIGS. 3 and 4, speaker device 301 can enable communication circuit 304 to be in the second state of the communication circuit to consume less power than the first state of communication circuit 304, as part of the operations performed at 506.

At 508, speaker device 301 can enable, in response to the entering the standby state, an audio processing circuit of the speaker device to be in a second state of the audio processing circuit to consume less power than a first state of the audio processing circuit. For example, as described for FIGS. 3 and 4, speaker device 301 can enable audio processing circuit 331 to be in the second state of the audio processing circuit to consume less power than a first state of the audio processing circuit, as part of the operations performed at 508.

There can be other operations performed by speaker device 301, which are not shown in process 500. For example, speaker device 301 can send one or more packets to host device 311; and determine there is no response packet received from host device 311, and further determine that host device 311 is in the inactive state. On the other hand, speaker device 301 can send one or more packets to host device 311, receive one or more response packets from host device 311, and determine that host device 311 is in the active state.

Example Computer System

Figure 6:
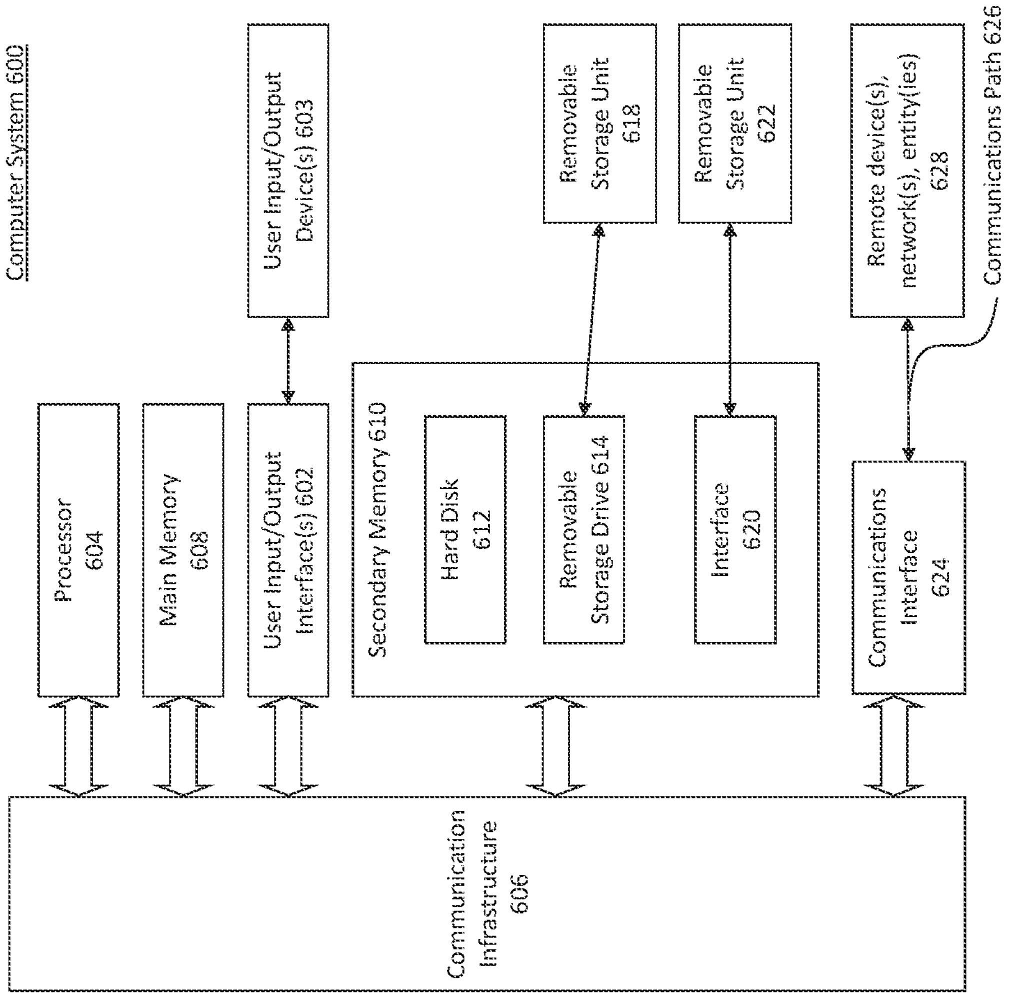
FIG. 6 illustrates an example computer system useful for implementing various embodiments.

Various embodiments may be implemented, for example, using one or more well-known computer systems, such as computer system 600 shown in FIG. 6. For example, media device 106, display device 108, downstream media device 109, speaker device 301, host device 311, or source media device 321 may be implemented using combinations or sub-combinations of computer system 600 to perform various functions described herein, e.g., by state diagram 400 or process 500. Also or alternatively, one or more computer systems 600 may be used, for example, to implement any of the embodiments discussed herein, as well as combinations and sub-combinations thereof.

Computer system 600 may include one or more processors (also called central processing units, or CPUs), such as a processor 604. Processor 604 may be connected to a communication infrastructure or bus 606.

Computer system 600 may also include user input/output device(s) 603, such as monitors, keyboards, pointing devices, etc., which may communicate with communication infrastructure 606 through user input/output interface(s) 602.

One or more of processors 604 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 600 may also include a main or primary memory 608, such as random access memory (RAM). Main memory 608 may include one or more levels of cache. Main memory 608 may have stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 may include a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 may read from and/or write to removable storage unit 618.

Secondary memory 610 may include other means, devices, components, instrumentalities or other approaches for allowing computer programs and/or other instructions and/or data to be accessed by computer system 600. Such means, devices, components, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB or other port, a memory card and associated memory card slot, and/or any other removable storage unit and associated interface.

Computer system 600 may further include a communication or network interface 624. Communication interface 624 may enable computer system 600 to communicate and interact with any combination of external devices, external networks, external entities, etc. (individually and collectively referenced by reference number 628). For example, communication interface 624 may allow computer system 600 to communicate with external or remote devices 628 over communications path 626, which may be wired and/or wireless (or a combination thereof), and which may include any combination of LANs, WANs, the Internet, etc. Control logic and/or data may be transmitted to and from computer system 600 via communication path 626.

Computer system 600 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 600 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 600 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600 or processor(s) 604), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 6. In particular, embodiments can operate with software, hardware, and/or operating system implementations other than those described herein.

CONCLUSION

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method for operating a wireless speaker device, comprising:
determining, by at least one computer processor, that a host device communicatively coupled to the wireless speaker device via a wireless network is in an active state;
in response to determining that the host device is in the active state:
transitioning the wireless speaker device to a connected state;
transitioning a communication circuit of the wireless speaker device to a first state of the communication circuit; and
transitioning an audio processing circuit of the wireless speaker device to a first state of the audio processing circuit;
determining that the host device is in an inactive state, wherein determining that the host device is in the inactive state comprises:
sending at least one data packet to the host device; and
determining that no response to the at least one data packet was received from the host device;
in response to determining that the host device is in the inactive state:
transitioning the communication circuit of the wireless speaker device to a second state of the communication circuit that is different than the first state of the communication circuit, wherein the communication circuit consumes less power in the second state of the communication circuit than the first state of the communication circuit; and
transitioning the audio processing circuit of the wireless speaker device to a second state of the audio processing circuit that is different than the first state of the audio processing circuit, wherein the audio processing circuit consumes less power in the second state of the audio processing circuit than the first state of the audio processing circuit.

2. The computer-implemented method of claim 1, wherein, in the first state of the communication circuit, the communication circuit is configured to communicate with the host device.

3. The computer-implemented method of claim 1, wherein, in the second state of the communication circuit, the communication circuit is configured to stop communication with the host device.

4. The computer-implemented method of claim 1, wherein, in the first state of the audio processing circuit, the audio processing circuit is configured to:
decode data packets received from the host device.

5. The computer-implemented method of claim 4, wherein, in the second state of the audio processing circuit, the audio processing circuit is configured to:
stop the decoding of the data packets received from the host device.

6. The computer-implemented method of claim 1, wherein the wireless speaker device comprises one of a speaker, a sound bar, or an audio/video receiver (AVR).

7. The computer-implemented method of claim 1, wherein the communication circuit includes a transceiver for the wireless network, and the audio processing circuit includes at least one of an audio amplifier, an audio codec, and audio mixer, or an audio frequency control circuit.

8. A wireless speaker device, comprising:
a communication circuit;
an audio processing circuit;
one or more memories; and
at least one processor each coupled to at least one of the one or more memories and configured to perform operations comprising:
determining that a host device communicatively coupled to the wireless speaker device via a wireless network is in an active state;
in response to determining that the host device is in the active state:
transitioning the wireless speaker device to a connected state;
transitioning the communication circuit of the wireless speaker device to a first state of the communication circuit; and
transitioning the audio processing circuit of the wireless speaker device to a first state of the audio processing circuit;
determining that the host device is in an inactive state, wherein determining that the host device is in the inactive state comprises:
sending at least one data packet to the host device; and
determining that no response to the at least one data packet was received from the host device;
in response to determining that the host device is in the inactive state:
transitioning the communication circuit of the wireless speaker device to a second state of the communication circuit that is different than the first state of the communication circuit, wherein the communication circuit consumes less power in the second state of the communication circuit than the first state of the communication circuit; and
transitioning the audio processing circuit of the wireless speaker device to a second state of the audio processing circuit that is different than the first state of the audio processing circuit, wherein the audio processing circuit consumes less power in the second state of the audio processing circuit than the first state of the audio processing circuit.

9. The wireless speaker device of claim 8, wherein, in the first state of the communication circuit, the communication circuit is configured to communicate with the host device.

10. The wireless speaker device of claim 8, wherein, in the second state of the communication circuit, the communication circuit is configured to stop communication with the host device.

11. The wireless speaker device of claim 8, wherein, in the first state of the audio processing circuit, the audio processing circuit is configured to:
decode data packets received from the host device.

12. The wireless speaker device of claim 11, wherein, in the second state of the audio processing circuit, the audio processing circuit is configured to:
stop the decoding of the data packets received from the host device.

13. The wireless speaker device of claim 8, wherein the wireless speaker device comprises one of a speaker, a sound bar, or an audio/video receiver (AVR).

14. The wireless speaker device of claim 8, wherein the communication circuit includes a transceiver for the wireless network, and the audio processing circuit includes at least one of an audio amplifier, an audio codec, and audio mixer, or an audio frequency control circuit.

15. A non-transitory computer-readable medium having instructions stored thereon that, when executed by at least one computer processor of a wireless speaker device, cause the at least one computer processor to perform operations comprising:

determining that a host device communicatively coupled to the wireless speaker device via a wireless network is in an active state;

in response to determining that the host device is in the active state:

transitioning the wireless speaker device to a connected state;

transitioning a communication circuit of the wireless speaker device to a first state of the communication circuit; and transitioning an audio processing circuit of the wireless speaker device to a first state of the audio processing circuit;

determining that the host device is in an inactive state, wherein determining that the host device is in the inactive state comprises:

sending at least one data packet to the host device; and determining that no response to the at least one data packet was received from the host device;

in response to determining that the host device is in the inactive state:

transitioning the communication circuit of the wireless speaker device to a second state of the communication circuit that is different than the first state of the communication circuit, wherein the communication circuit consumes less power in the second state of the communication circuit than the first state of the communication circuit; and transitioning the audio processing circuit of the wireless speaker device to a second state of the audio processing circuit that is different than the first state of the audio processing circuit, wherein the audio processing circuit consumes less power in the second state of the audio processing circuit than the first state of the audio processing circuit.

16. The non-transitory computer-readable medium of claim 15, wherein, in the first state of the communication circuit, the communication circuit is configured to communicate with the host device.

17. The non-transitory computer-readable medium of claim 15, wherein, in the second state of the communication circuit, the communication circuit is configured to stop communication with the host device.

18. The non-transitory computer-readable medium of claim 15, wherein, in the first state of the audio processing circuit, the audio processing circuit is configured to:

decode data packets received from the host device.

19. The non-transitory computer-readable medium of claim 18, wherein, in the second state of the audio processing circuit, the audio processing circuit is configured to:

stop the decoding of the data packets received from the host device.

20. The non-transitory computer-readable medium of claim 15, wherein the communication circuit includes a transceiver for the wireless network, and the audio processing circuit includes at least one of an audio amplifier, an audio codec, and audio mixer, or an audio frequency control circuit.

* * * * *